United States Patent
Dumler et al.

(10) Patent No.: US 8,444,118 B1
(45) Date of Patent: May 21, 2013

(54) COOLING TOWER SYSTEM WITH CHEMICAL FEED RESPONSIVE TO ACTUAL LOAD

(75) Inventors: Stephen E. Dumler, Colleyville, TX (US); Blaine T. Y. Nagao, Colleyville, TX (US)

(73) Assignee: H2trOnics, Inc., Grapevine, TX (US)

( * ) Notice: Subject to any disclaimer, the term of this patent is extended or adjusted under 35 U.S.C. 154(b) by 339 days.

(21) Appl. No.: 12/842,610

(22) Filed: Jul. 23, 2010

Related U.S. Application Data

(60) Provisional application No. 61/228,150, filed on Jul. 23, 2009.

(51) Int. Cl.
*B01F 3/04* (2006.01)

(52) U.S. Cl.
USPC .................. 261/26; 261/27; 261/DIG. 11

(58) Field of Classification Search
USPC ........... 261/26, 27, DIG. 11, DIG. 46; 62/171
See application file for complete search history.

(56) References Cited

U.S. PATENT DOCUMENTS

| | | | | | |
|---|---|---|---|---|---|
| 3,094,133 | A | * | 6/1963 | Treanor | 137/101.11 |
| 3,196,892 | A | * | 7/1965 | Savage et al. | 137/114 |
| 3,223,121 | A | * | 12/1965 | Lee | 366/340 |
| 3,282,277 | A | * | 11/1966 | Hayman | 137/3 |
| 3,292,650 | A | * | 12/1966 | Bird et al. | 137/93 |
| 3,450,265 | A | * | 6/1969 | Kreusch et al. | 210/140 |
| 3,592,212 | A | * | 7/1971 | Schleimer et al. | 137/93 |
| 3,627,032 | A | * | 12/1971 | Glad et al. | 261/3 |
| 3,754,741 | A | * | 8/1973 | Whitehurst et al. | 261/151 |
| 3,918,469 | A | * | 11/1975 | Zamboni et al. | 137/5 |
| 4,259,269 | A | * | 3/1981 | Flowers | 261/151 |
| 4,273,146 | A | * | 6/1981 | Johnson | 137/5 |
| 4,460,008 | A | * | 7/1984 | O'Leary et al. | 137/93 |
| 4,464,315 | A | * | 8/1984 | O'Leary | 261/110 |
| 4,475,356 | A | * | 10/1984 | Lewis | 62/183 |
| 4,834,955 | A | * | 5/1989 | Mouche et al. | 423/243.05 |
| 4,946,140 | A | * | 8/1990 | Kajihara | 261/18.1 |

* cited by examiner

*Primary Examiner* — Charles Bushey
(74) *Attorney, Agent, or Firm* — Kirby B. Drake; Klemchuk Kubasta LLP

(57) ABSTRACT

An apparatus for use in a cooling tower system may include a circulating fluid system. The apparatus may include a mechanism to receive an electrical signal representative of load on the cooling tower system. The apparatus also may include a mechanism to control fluid communication of at least one chemical into the circulating fluid system in response to the electrical signal.

17 Claims, 2 Drawing Sheets

COOLING TOWER SYSTEM WITH CHEMICAL FEED RESPONSIVE TO ACTUAL LOAD

CROSS-REFERENCES TO RELATED APPLICATIONS

This application claims priority under 35 U.S.C. §119, and the benefit of the filing date, of U.S. Provisional Application No. 61/228,150, filed Jul. 23, 2009.

STATEMENT REGARDING FEDERALLY SPONSORED RESEARCH OR DEVELOPMENT

Not Applicable.

BACKGROUND OF THE INVENTION

The present embodiments relate to chemical feed systems and are more particularly directed to chemical feed to a cooling tower system.

Cooling tower systems are known to remove heat, typically by circulating fluid such as water, through the system that includes the cooling tower (or more than one such tower), where the circulating water experiences a temperature drop as it passes through the tower. Cooling towers may be used in various systems where it is desired to remove heat from circulating water, or in conjunction with removing heat from another fluid by way of a heat exchanger that couples the other fluid to the circulated water of the cooling tower. For example, in an air conditioning cooling tower system, sometimes referred to as HVAC, the system includes a chiller/heat exchanger (i.e., condenser) through which the circulating cooling tower water passes and thereby removes heat from a separate chill side fluid in the chiller/heat exchanger by transferring that heat to the water that is circulating to the cooling tower. In this way, the chill side fluid may be used to cool air in the air conditioning system of buildings, hospitals, schools, businesses, and the like, while the circulating water in the cooling tower continues to circulate to carry heat away from the chiller/heat exchanger. Thus, the circulating water is cooled by the cooling tower, typically and primarily by evaporation that is achieved by ambient air crossing a flow of water, and the resulting cooled water is again circulated, again to the chiller/heat exchanger and so forth in a generally continuous loop so as to facilitate the heat transfer function.

Cooling tower systems according to the art also include apparatus to supply new water into the circulation system. Newly-added water replaces water that is lost from the circulation process, such as through evaporation of fluid by the cooling tower(s) as well as due to removal of water in order to discard solids or otherwise maintain impurities in the water at an acceptable level, where such removal is sometimes referred to as blow-down, bleed, or draw-off. Still other aspects may cause loss of water from the process, such as so-called drift (or windage), spills, and leaks. In any event, with these losses, the system includes a controlled source from which new water is introduced into the system, typically referred to as make-up water.

Cooling tower systems according to the art also include apparatus to supply chemical(s) into the circulation system so as to provide a desirable level of stability to the circulating water. The chemical may reduce or inhibit any of impurities in the water, scale, deposits, corrosion, sludge, biological activity, and any negative effect such impurities can have on the system components, such as scaling, fouling, and the like. Further, the evaporative effect provided by the cooling tower causes pure water to evaporate, thereby also causing un-evaporated residue that was in the water prior to evaporation to remain in the circulating system and, hence, over time the quantity or concentration of such residue will increase. Accordingly, it is known in the art, and the preferred embodiments are directed in this regard, to introduce chemical(s) into the cooling tower system to counterbalance, offset, and neutralize the impurities in the circulating water, thereby: (i) improving the operation of the system; (ii) significantly lengthening the amount of time that a given quantity of water may be used in the system; and (iii) reducing the necessary system maintenance that otherwise would be required from higher levels of impurities that would accumulate and the effect such impurities would have on the cooling system components.

The prior art has controlled the supply (or "feed") of chemical(s) into a cooling tower circulation system using various approaches. While these approaches have sustained various systems, they also have certain drawbacks, as further introduced below.

In one prior art approach, a pump is electrically controlled to supply chemicals once the amount of make-up water added to the system exceeds a threshold amount. This approach relies on the assumption that make-up quantity accounts for any loss from evaporation and blow-down (and other losses). Specifically, after a certain amount of make-up water passes through a meter, the chemical pump is enabled to feed chemicals based on the amount of make-up water that meter has determined was added. This system, therefore, requires and relies upon a meter. Hence, additional costs are required from the meter. Further, if the meter is inaccurate or fails, then chemical feed is improperly controlled. Moreover, the make-up process itself may have a considerable deadband, that is, an imprecise measuring differential and corresponding time period where lost water has not yet been re-added to the system or has not been properly detected as added, such as may occur because determining the typically large volume of water in the water tower cooling systems is not trivial—this deadband, therefore, delays the addition or detection of make-up water which of course then also delays the chemical feed that only occurs after the detected make-up water volume has exceeded a threshold.

Another prior art approach is sometimes referred to as a feed and bleed system, meaning feed of chemicals is followed by a bleed, via blow-down, to obtain a proper concentration of chemicals in the system. The determination of the concentration is typically measured by a probe in the system that evaluates the conductivity of the circulating water. In response to the water conductivity, electrically-controlled apparatus such as pumps and valves are operated to feed desired amounts of chemical and to bleed water/chemicals/impurities from the system, both being adjusted until the measured conductivity is determined to be acceptable. This system therefore requires the cost of the sensor(s) and require considerable maintenance. Additionally, this system operates independently of make-up and also has a potential time lag before it reacts, so that a proper chemical balance existing before make-up may become an improper chemical balance once make-up is performed, that is, until the next iteration of the feed/bleed process following that make-up.

Given the preceding, prior art cooling tower systems and more particularly the chemical feed systems thereof have certain drawbacks. Moreover, undesirable chemical concentrations may expedite the wear on various system components, thereby decreasing operational efficiency and increasing both costs and maintenance. The preferred embodiments, therefore, seek to improve upon such considerations, as further detailed below.

BRIEF SUMMARY OF THE INVENTION

In one preferred embodiment, there is an apparatus for use in a cooling tower system comprising a circulating fluid system. The apparatus comprises means for receiving an electrical signal representative of load on the cooling tower system. The apparatus also comprises means for controlling fluid communication of at least one chemical into the circulating fluid system in response to the electrical signal.

Numerous other aspects are also disclosed and claimed.

DETAILED DESCRIPTION OF THE INVENTION

The preferred embodiments relate to a chemical feed system as may be implemented in a cooling tower system, where the cooling tower system circulates fluid (e.g., water) that is cooled through the tower and then distributed to a destination where heat is then added to the fluid, the fluid returning to the tower for cooling, and so forth in a circulating fashion. Cooling towers may be used in various systems where it is desired to remove heat from circulating water, or in conjunction with removing heat from another fluid by way of a heat exchanger that couples the other fluid to the circulated water of the cooling tower. By way of a preferred example, the preferred embodiments are in some instances discussed in the context of an air conditioning system, sometimes referred to as HVAC, where as discussed in the Background Of the Invention Section of this document cooled water from the cooling tower system passes to a chiller/heat exchanger (i.e., condenser) and removes heat from a separate chill side fluid in the chiller/heat exchanger by transferring that heat to the water that is circulating to the cooling tower. The preferred embodiments, however, may be implemented in other systems as well, as may be ascertained by one skilled in the art.

Figure 1:
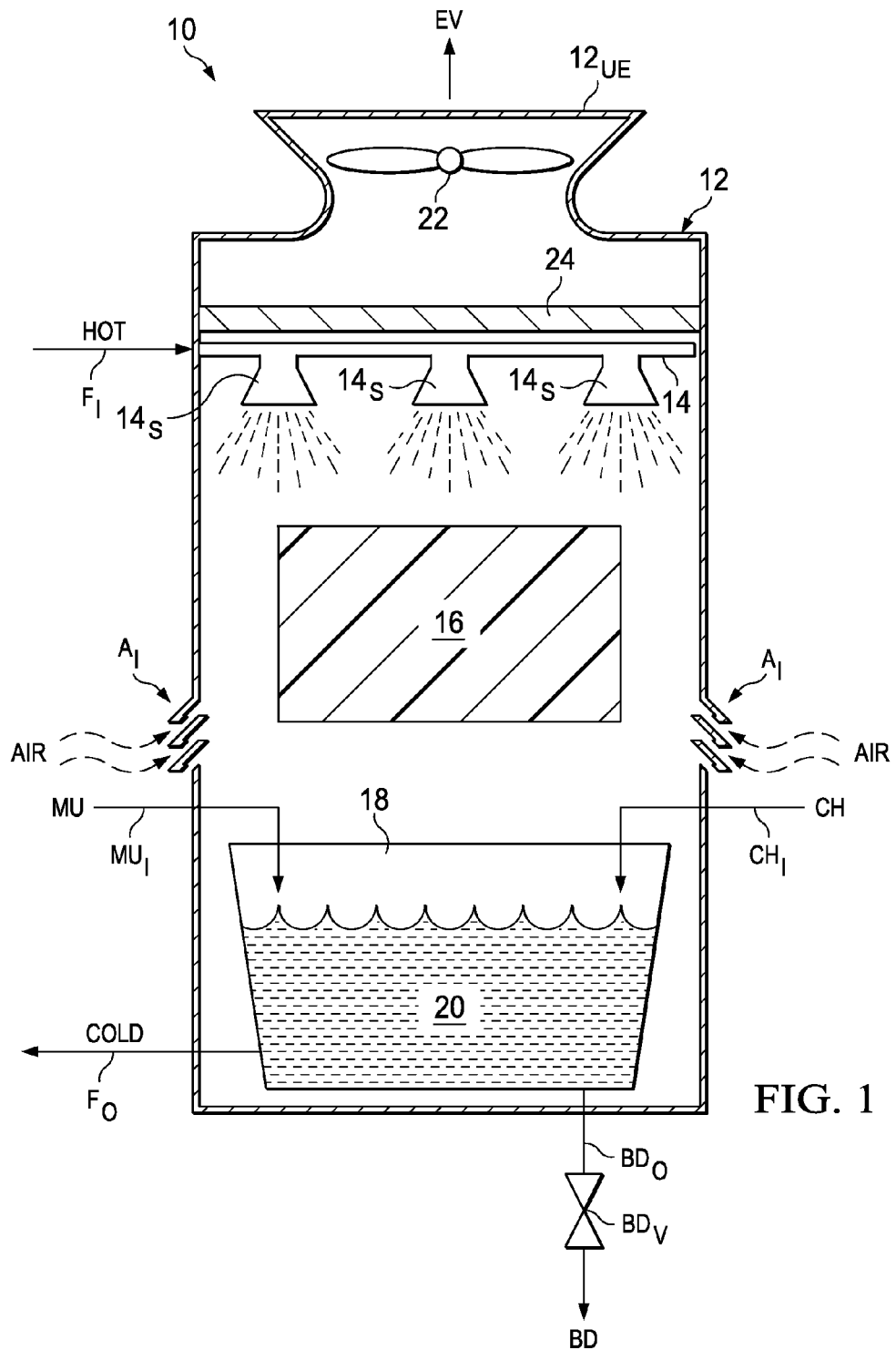
FIG. 1 illustrates a functional block diagram of a cooling tower system known in the art and further improved in connection with the inventive scope.

FIG. 1 illustrates a functional block diagram of a cooling tower system 10 that as shown generally in FIG. 1 is known in the art, but it is improved in connection with the present inventive scope as further detailed later. Thus, by way of introduction, various known aspects are first discussed as may be further understood or modified with known or ascertainable aspects by one skilled in the art. System 10 includes a cooling tower 12 with a fluid input $F_I$ and a fluid output $F_O$; typically and for the sake of discussion herein, the fluid is water and arrives at input $F_I$ at a higher temperature relative to when it exits at output $F_O$. For sake of reference later, note that in the art the temperature difference between the fluid from input $F_I$ to output $F_O$ is typically referred to as the range of system 10. Input $F_I$ fluidly communicates with a water distribution mechanism 14 that introduces the water toward the interior and near the top of tower 12 so that the fluid may flow downward as further appreciated from the remaining discussion; in certain applications, distribution mechanism 14 may include spray nozzles $14_S$ so as to distribute the water in droplets of desired size and spray pattern to improve the heat transfer functionality of system 10.

Below distribution mechanism 14 is located fill 16 (e.g., film or splash). Fill 16 may be formed of various materials and shapes and provides surfaces over which the downward flowing water travels to increase the surface area and time of contact between air and water so as to improve heat transfer from water to air.

Below fill 16 is a water basin 18, storing a water pool 20 that endeavors to capture all of the water that flows past fill 16 and is not otherwise evaporated as described below. In addition to receiving water from water distribution mechanism 14, water basin 18 (or elsewhere in the circulation path) receives supply from two input sources $MU_I$ and $CH_I$. Input source $MU_I$ provides a make-up (MU) supply of water, and input source $CH_I$ provides a chemical (CH) feed of one or more chemicals. Each source $MU_I$ and $CH_I$ therefore can add to the circulating water of system 10. While input sources $MU_I$ and $CH_I$ are shown with completely different entry points to basin 18, they may be sourced at other points into the circulating path of the fluid from system 10, and input $CH_I$ may be in the form of an eductor (or jet pump) in which case the energy from the circulating fluid may be used to draw in chemicals, as controlled by a valve and as also illustrated later. Circulating fluid also may be removed from water basin 18 (or elsewhere in the circulation path) via a blow-down (or bleed) output $BD_O$, which cooperates with a blow-down valve $BD_V$ to provide the blow-down BD waste.

Tower 12 also has various attributes to facilitate the flow of air through it. By way of the illustrated example, tower 12 includes air inlets $A_I$, typically for introducing ambient air into the interior of tower 12. Tower 12 also may include a fan 22, or more than one such fan in which case each fan is sometimes referred to as corresponding to a tower cell, where fan 22 is for advancing the air toward the upper end $12_{UE}$ of tower 12. Fan 22 is used in a so-called mechanical draft tower system that may be further subdivided as an induced or forced system, where the location of the fan typically dictates whether the system is considered induced or forced. Moreover, note that the use of a fan is optional in certain cooling towers, where a fanless approach is commonly referred to as a natural draft tower, typically having large concrete chimneys to introduce air used where large flow rates are desired (e.g., 200 k gal/min or greater). Natural draft cooling towers are particularly attractive as a cost-saving solution for larger power stations and industrial plants requiring greater quantities of cooling water.

Various aspects of the operation of system 10 are now described, again as known to one skilled in the art. In general, tower 12 receives relatively hot fluid at input $F_I$ and through an evaporative process cools the fluid for distribution as relatively cold fluid via output $F_O$. More particularly, the water and any chemicals or other matter therein is distributed in a generally downward path from water distribution 14, through fill 16, and to basin 18. Also in this regard and as a brief aside, tower 12 may include a drift eliminator 24 so as to reduce water loss that otherwise could occur due to drift or windage. At the same time that water is introduced downward, air enters tower 12 via inlets $A_I$ and is directed to make contact with the downward traveling water, whether the air movement is forced via fan 22 or via the buoyancy of natural draft; the air may move in the opposite direction of the water which is referred to as a counterflow approach, or the air may move generally in a perpendicular direction relative to the downward flow of water which is referred to as a crossflow approach. In either event, evaporation occurs such that some of the downward traveling water experiences a phase change to vapor and escapes upwardly (i.e., evaporates) out of upper end $12_{UE}$ of tower 12. Indeed, the quantity of water lost via evaporation may seem quite significant to the uniformed observer, and can be in the hundreds of gallons per minute or more. In addition to water lost via evaporation, water is also periodically removed from system 10 via blow-down output $BD_O$, so as to keep the amount of solids in the circulating fluid within an acceptable range.

The operation of system 10 further includes accommodations for the loss of water and change of concentration of other materials circulating with the water, both of which occur from evaporation, blow-down, as well as other sources of loss. As water loss occurs, primarily due to both evaporation and blow-down, the overall amount of circulating fluid obviously is reduced; hence, make-up water MU is introduced at input $MU_I$, where such water may be from various sources and the expected chemistry of that water is taken into account in the operation, chemical treatment, and eventual blow-down as well. As introduced earlier and now further explored, one or more chemicals CH are introduced at input $CH_I$ so as to be added to the circulating water so as to reduce or inhibit impurities and their effects on the system. More specifically, and also as water loss occurs, again primarily due to both evaporation and blow-down, the concentration of the chemicals in the water obviously changes. Thus, according to the preferred embodiments and as detailed below, a system is provided to feed such chemicals into the circulating water at a particularly desirable rate and according to a preferred embodiment methodology.

Figure 2:
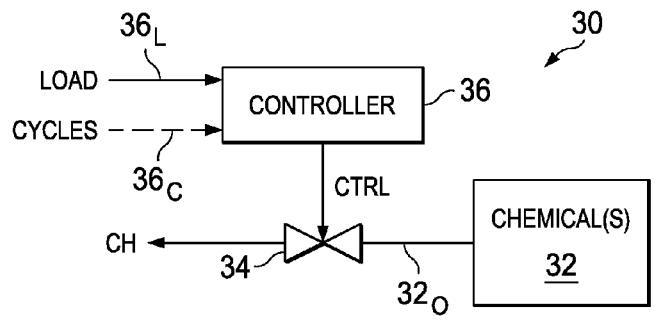
FIG. 2 illustrates a block diagram of a chemical delivery system according to a preferred embodiment.

FIG. 2 illustrates a block diagram of a chemical delivery system 30, where system 30 is intended to illustrate a preferred embodiment apparatus and methodology for delivering a chemical or chemicals CH to chemical input $CH_I$ of FIG. 1. System 30 includes a chemical supply 32, which may be any form of container or source to store the chemical(s) desired for delivery to the circulating fluid of tower 10. The particular chemical(s) are those to address or inhibit the potential issues addressed earlier with respect to a water circulation system. A line or output $32_O$ of chemical supply 32 is coupled to an input of what is shown in FIG. 2 schematically as a valve 34, where the use of a valve is intended to illustrate a controllable feed apparatus that may be enabled to allow flow through it or disabled to discontinue flow through it, without any other particular limitation to a given type of valve, pump, eductor, or the like.

Valve 34 is controlled by a controller 36, which in the preferred embodiment is an appropriate combination of electrical/electronic circuitry, including hardware and/or software, operable to receive an input signal or signals and output a control signal as detailed herein. Thus, such circuitry may be configured by one skilled in the art to be programmable or functional so as to implement the methodologies of the inventive scope. More specifically, controller 36 operates to control valve 34 to either enable or disable fluid flow through it, and this control aspect is illustrated by way of a control signal CTRL in FIG. 2, which therefore may demonstrate that valve 34 is itself responsive to operate based on a control input. For reasons further detailed below, controller 36 receives at an input $36_L$ a LOAD signal (or a multiplicand of LOAD as also later described), and optionally controller 36 also receives at an input $36_C$ a CYCLES signal. Thus, in response to one or both of its input signals, controller 36 asserts its control signal CTRL to either enable or disable the flow of chemicals through valve 34, to thereby provide or stop the provision of chemical from supply 32 of FIG. 2 to inlet $CH_I$ of FIG. 1. In addition, in one preferred embodiment, the LOAD signal is a separate signal from the CYLCES signal. However, in an alternative preferred embodiment, one skilled in the art may provide apparatus, such as circuitry or the like, to combine or otherwise mix these signals to achieve the functionality described in this document.

The LOAD signal in FIG. 2 is preferably an electrical signal, analog or digital, that represents the heat load imposed on tower 12, as that term is understood in the art and further explored later. By way of introduction, load may be comprehended based on typical cooling tower design criteria—in the typical design, a system is created to provide a maximum amount of load, typically expressed in BTUs or tonnage (i.e., cooling tower tons), when operating at 100 percent. For example, assume that a given system is designed to remove 500 tons of heat when operating at 100 percent. Thus, at 100 percent load, 500 tons of heat are removed, whereas at 90 percent load, for example, 450 tons of heat are removed, and whereas at 85 percent load, for example, 425 tons of heat are removed, and so forth for other less-than-one-hundred percent values of the maximum 500 ton capacity. Various factors may affect load at a given time, such as thermostat setting(s) when the tower is in connection with an HVAC system, as well as ambient temperature, humidity, and pressure. Indeed, heat load is typically expressed as a product, which includes in its multiplicands the flow rate of water through tower 12 as well as the range, which recall earlier was noted as the difference in water temperature between inlet $F_I$ and outlet $F_O$. Typically, system 10 is designed so that flow rate is relatively constant and, therefore, range may vary due to the above-noted factors, thereby changing the load on the system at different times. In any event, in a preferred embodiment the LOAD signal is directly or indirectly responsive to, or representative of, range and flow rate and may be obtained from various sources. For example, certain buildings include a so-called Building Management System (BMS) that provides an electronic signal representative of load, where this signal has been heretofore used for purposes such as tracking energy use and determining sufficiency and efficiency of existing cooling machinery. This information could be transmitted via wire or wirelessly. Further, the LOAD signal may be of various forms, including analog, field buss, or pulse proportional.

The CYCLES signal is an electrical signal, analog or digital, that is affected by the change in ratio of chemicals that has occurred between times that make-up water is introduced into the circulating water. More particularly, as make-up water is added along with, or followed by, the addition of chemicals, then water loss occurs (e.g., from evaporation, blow-down, or other loss), thereby changing the ratio of chemical concentration from when there was more water in the system to after water loss has occurred. This ratio change is referred to in the art as CYCLES (or cycles of concentration), and may be mathematically represented according to the following Equation 1:

$$\text{CYCLES} = \frac{\text{concentration of specfic chemical(s) in circulating water}}{\text{concentration of specfic chemical(s) in make-up water}} \quad \text{Equation 1}$$

As can be seen in Equation 1, one manner of evaluating CYCLES can be a sensor or the like that evaluates the concentration of a chemical or chemicals in two different locations, where CYCLES is then the ratio of the two. Note also that it is known in the art that it is generally favorable to operate a cooling tower at a larger number of cycles within the range of operability but within limits so as to avoid fouling and the like, as a greater number of cycles reduces the amount of required blow-down, thereby reducing the amount of water loss and necessarily also reducing the amount of required make-up (and required chemicals that would be associated with the make-up).

Figure 3:
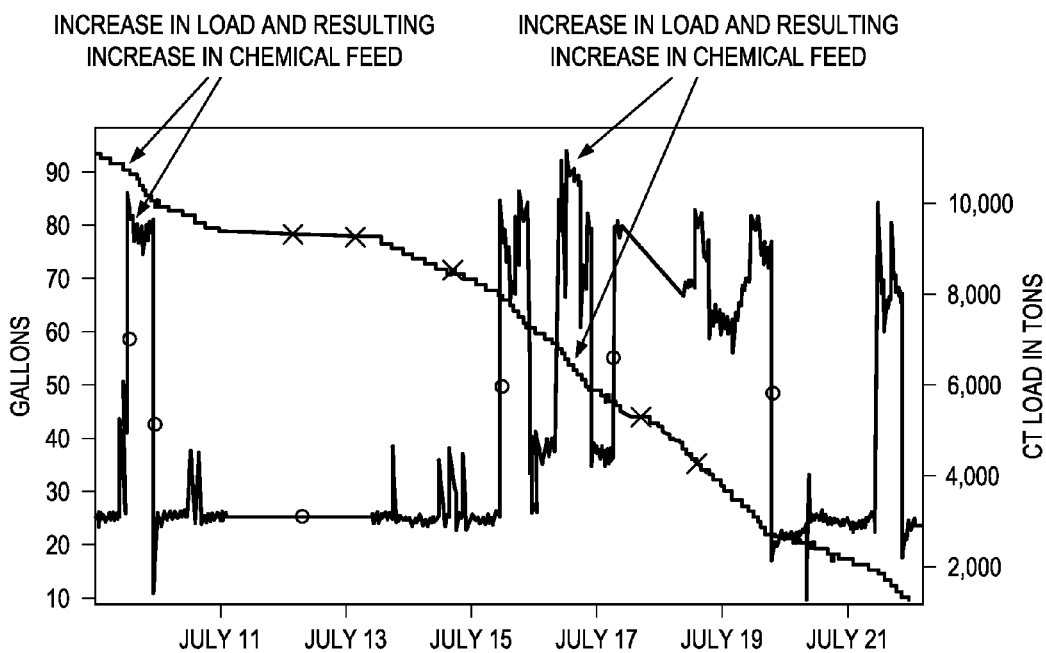
FIG. 3 illustrates an example of preferred embodiment methodology and its results.

The operation of a preferred embodiment apparatus and methodology as understandable in connection with FIGS. 1 and 2 are now described, and they are further explored in connection with FIG. 3. Specifically, FIG. 3 illustrates an example of preferred embodiment methodology and its results by plotting heat load relative to the right vertical axis (marked with o), and chemical consumption (marked with x) relative to the left vertical axis, both over time—in the example illustrated, time is shown on the horizontal axis and as a number of days with dates shown. In accordance with this preferred embodiment example, controller 36 issues its control signal CTRL to valve 34 to feed chemicals proportional to the heat load represented by the LOAD signal, that is, in response to cooling tower load; in other words, the preferred embodiment methodology introduces one or more chemicals into the water cooling circulation system in response to the indication of the then-existing (heat) load (i.e., LOAD signal) imposed on the cooling tower system 10. Preferably, controller 36 issues this control in response to the cooling tower load either in real-time or within a very short lag in time (e.g., within a few seconds, such as less than one minute or even more favorably less than 10 seconds) after load changes so as to have a corresponding short period of time when controller 36 and valve 34 operate to respond, where in any event the LOAD signal is transmitted to controller 36 via an intermediate controller or directly from the chiller load data source. In response to the signal, controller 36 real-time or near real-time controls valve 34 to produce a resulting chemical feed volume that is adjusted so that it is proportional to the tower load, thereby providing chemical into the circulating system that is commensurate with the then-existing heat load on the system.

The previously-described operation may be appreciated by various examples in FIG. 3. As a first example, as may be seen prior to July 11, a transition occurs where load increases, as shown by the illustrated LOAD signal, from a first period having level between 2,000 and 4,000 cooling tower tons to a second period having a level between 8,000 and 10,000 cooling tower tons. As a result, in response to the above-described LOAD signal, controller 36 and valve 34 increase the provision of chemical from supply 32 injection into the circulating fluid of tower 12 to feed during the second period a greater amount of chemical into the cooling tower system water as compared to that fed during the first period, as depicted in FIG. 3 by the greater downward slope corresponding to the second period, thereby indicating an increase of chemical consumption from supply 32 during the second period relative to the first period. As a second example, from a third period spanning approximately July 11 to July 13, load remains relatively constant. As a result, in response to the LOAD signal, controller 36 and valve 34 reduce or cease chemical provision from supply 32 into the circulating fluid of tower 12, particularly as compared to that fed during the above-described second period, thereby providing only a very slightly or no downward slope in chemical consumption during the third period. One skilled in the art will therefore recognize from the remainder of FIG. 3 the periods of larger heat load and the corresponding preferred embodiment response of feeding a larger amount of chemical from supply 32 in response to those heat loads during those periods, with the sharper steepness of the downward slope illustrating the respectively corresponding larger amount of chemical consumption from supply 32 during those periods. Conversely, the periods of lesser heat load and the corresponding preferred embodiment response of feeding a lesser (or no) amount of chemical from supply 32 in response to those heat loads during those periods, with the lesser steepness of downward slope illustrating the respectively corresponding lesser amount of chemical consumption from supply 32 during those periods.

Recall from FIG. 2 that controller 36 also may optionally in an alternative preferred embodiment receive the CYCLES signal as an input, where as detailed earlier that signal is representative of the then-operating cycles of concentration of a chemical or chemicals in the cooling tower circulating fluid. Note also that Equation 1 determination of CYCLES can be provided by existing control systems or from within a control system as part of system 10. The calculation is normally done in almost real time, however, it can be calculated periodically and be manually added to the process calculation. In any event, in this alternative preferred embodiment, controller 36 controls valve 34 not only in response to the LOAD signal, but also in response to the cycles of concentration as represented by the CYCLES signal. More particularly, recall from earlier that a larger number of cycles within the range of operability reduces the amount of required blow-down, thereby reducing the amount of water loss and also reducing the amount of required chemicals (and make-up). Thus, in the alternative preferred embodiment, as the CYLCES signal represents a relatively larger number of cycles, controller 36 further causes valve 34 to decrease the chemical feed from supply 32, and conversely as the CYLCES signal represents a relatively lesser number of cycles, controller 36 further causes valve 34 to increase the chemical feed from supply 32, both in combination with the additional indication of the LOAD signal.

According to one preferred embodiment, the following is an example of how a chemical injection pump would be sized and how its feed rate, in response to heat load per the preceding, could be nominally calculated. First, the following Equations 2 through 6 are known to one skilled in the art:

$$\text{evaporation gpm} = x \text{ ton load} * \text{design gpm per ton} * \text{design tower } \Delta\ T\ °F * 0.001 * \text{evaporation factor} \quad \text{Equation 2}$$

$$\text{blowdown gpm} = \frac{\text{evaporation gpm}}{(\text{cycles} - 1)} \quad \text{Equation 3}$$

$$\text{make-up gpm} = \text{evaporation gpm} + \text{blowdown gpm} \quad \text{Equation 4}$$

$$\text{Product volume per ton of load (lbs)} = \frac{\text{make-up volume} * \text{target ppm}}{120,000} \quad \text{Equation 5}$$

$$\text{Product volume per ton of load(gallons)} = \frac{\text{product volume per ton of load (lbs)}}{\text{product lbs per gallon}} \quad \text{Equation 6}$$

Next, therefore, assume an example scenario of 120 ppm of product at a 1,000 ton load operating at 4 cycles of concentration and a 10° F. Range (i.e., $\Delta T$) with an evaporation factor of 1 and a design rate of 3 gpm per ton. Then, Equation 2 is solved as shown in the following Equation 2.1:

$$\text{evaporation gpm} = \quad \text{Equation 2.1}$$
$$30 \text{ gpm} = 1,000 \text{ ton load} * 3 \text{ gpm per ton} * 10 * 0.001 * 1$$

Equation 3 is solved as shown in the following Equation 3.1:

$$\text{blowdown gpm} = 10 \text{ gpm} = \frac{30 \text{ gpm}}{(4-1)} \quad \text{Equation 3.1}$$

Equation 4 is solved as shown in the following Equation 4.1:

$$\text{make-up gpm} = 40 = 30 \text{ gpm} + 10 \text{ gpm} \quad \text{Equation 4.1}$$

The above calculations may be performed by various preferred embodiments using apparatus and methodology known in the programmable apparatus art, such as through various combinations of hardware and software (including firmware).

Moreover, the preferred embodiment also contemplates including system-specific parameters into the determination of chemical feed, that is, given the indication of heat load, then the resulting corresponding chemical feed is responsive to both the heat load as well as to one or more parameters that may be specific to the particular implementation of the cooling tower system at issue (e.g., site specific considerations), and as shown above these parameters may include CYCLES. These system-specific parameters, therefore, may be programmed into controller 36, and may be static or dynamic in different preferred embodiments. Thus, when the data generated above is combined with a chemical flow metering device the calculation of parts per million (ppm) of product in the system may be derived by controller 36. This determination can be used to adjust valve 34 to allow a chemical output or flow to a target ppm from supply 32. An example of this calculation would be as in the following Equation 7:

$$\text{Product ppm} = \quad \text{Equation 7}$$
$$\frac{\text{chemical flow meter total in gallons} * \text{product pound per gallon} * 120,000}{\text{calculated make-up} * \text{actual (or calculated) cycles}}$$

From the above, it may be appreciated that the preferred embodiments provide a cooling tower system with chemical feed responsive to actual load. As illustrated above, the preferred embodiment cooling tower system may be used in combination with other systems, where HVAC is shown as but an example that may particularly implement and benefit from the inventive scope. Numerous aspects have been observed above and additional ones should be appreciated from the previous details. Moreover, one skilled in the art should appreciate that the preferred embodiments provide various benefits over the prior art. As one example, there is a reduction or elimination of metering and the respective inaccuracies, as well and the costs and maintenance that accompany such aspects. As another example, therefore, more efficient chemical feed improves the accuracy and use chemicals used in the feed, and therefore there also improvements in having more accurate chemical concentration. As still another example, the real-time or very short time lag between load change (or cycle change) and the change in supply of chemical feed provides a greater likelihood of a desirable concentration of chemicals in the cooling tower system more often than in the prior art. Thus, while various alternatives and benefits have been provided according to preferred embodiments, and still others may be ascertained by one skilled in the art, one skilled in the art should further appreciate that while the present embodiments have been described in detail, various substitutions, modifications or alterations could be made to the descriptions set forth above without departing from the inventive scope, as is defined by the following claims.

The invention claimed is:

1. A system for controlling chemical feed to a cooling tower system having a circulating fluid, the system comprising:
   a chemical supply storing one or more chemicals to be delivered into the circulating fluid, the chemical supply having a supply line coupled to a controllable chemical feed apparatus; and
   means for generating and sending a load signal,
   means for generating and sending a cycles signal,
   a controller for receiving the load signal and the cycles signal, the controller being capable of interpreting the load signal and the cycles signal and generating and sending a control signal to the controllable chemical feed apparatus to provide controlled adjustment of the chemical feed supplied from the chemical supply to the cooling tower system proportional to the heat load on the cooling tower system.

2. The system of claim 1, wherein the load signal is a separate signal from the cycles signal.

3. The system of claim 1, wherein the load signal and the cycles signal are a combined signal.

4. The system of claim 1 wherein the cycles signal is provided through a sensor that evaluates the concentration of one or more chemicals in the circulating fluid in comparison to the concentration of one or more chemicals in a make-up fluid.

5. The system of claim 1 wherein the generating and sending of the control signal is performed in real time.

6. A system for controlling chemical feed to a cooling tower system having a circulating fluid, the system comprising:
   a chemical supply storing one or more chemicals to be delivered into the circulating fluid, the chemical supply having a supply line coupled to a controllable chemical feed apparatus;
   a sensor for sensing a heat load associated with the circulating fluid within the cooling tower system;
   means for generating and sending a load signal;
   means for generating and sending a cycles signal; and
   a controller for receiving the load signal and the cycles signal, the controller being capable of interpreting the load signal and the cycles signal and generating and sending a control signal to the controllable chemical feed apparatus to provide controlled adjustment of the chemical feed supplied from the chemical supply to the cooling tower system proportional to the heat load on the cooling tower system.

7. The system of claim 6, wherein the load signal is a separate signal from the cycles signal.

8. The system of claim 6, wherein the load signal and the cycles signal are a combined signal.

9. The system of claim 6 wherein the load signal and the cycles signal are received through the same input on the controller.

10. The system of claim 6 wherein the generating and sending of the control signal is performed in real-time.

11. A method of controlling chemical feed to a cooling tower system having a circulating fluid, the method comprising:

receiving a load signal;

receiving a cycles signal; and sending a control signal to a controllable chemical feed apparatus to adjust chemical feed supplied from a chemical supply to the cooling tower system proportional to a head load on the cooling tower system, wherein the control signal is sent in response to the load signal and the cycles signal.

12. The method of claim 11, wherein the load signal is a separate signal from the cycles signal.

13. The method of claim 11, wherein the load signal and the cycles signal are combined.

14. The method of claim 11 wherein the cycles signal is provided through a sensor that evaluates the concentration of one or more chemicals in the circulating fluid in comparison to the concentration of one or more chemicals in a make-up fluid.

15. The method of claim 11 wherein the control signal is sent in real-time after the load has changed in the cooling tower system receiving the chemical feed.

16. The method of claim 11, wherein sending the control signal comprises increasing the chemical feed in response to an increase in load on the cooling tower system.

17. The method of claim 11 wherein sending the control signal comprises decreasing the chemical feed in response to a decrease in load on the cooling tower system.

* * * * *